US009129524B2

(12) United States Patent
Delibaltov et al.

(10) Patent No.: US 9,129,524 B2
(45) Date of Patent: Sep. 8, 2015

(54) METHOD OF DETERMINING PARKING LOT OCCUPANCY FROM DIGITAL CAMERA IMAGES

(75) Inventors: Diana L. Delibaltov, Goleta, CA (US); Wencheng Wu, Webster, NY (US); Robert P. Loce, Webster, NY (US); Edgar Bernal, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 594 days.

(21) Appl. No.: 13/433,809

(22) Filed: Mar. 29, 2012

(65) Prior Publication Data
US 2013/0258107 A1 Oct. 3, 2013

(51) Int. Cl.
G06K 9/00 (2006.01)
G08G 1/04 (2006.01)
G08G 1/065 (2006.01)
G06K 9/62 (2006.01)
H04N 7/18 (2006.01)
G06K 9/46 (2006.01)

(52) U.S. Cl.
CPC .............. *G08G 1/04* (2013.01); *G06K 9/00785* (2013.01); *G06K 9/00812* (2013.01); *G06K 9/6269* (2013.01); *G08G 1/065* (2013.01); *G06K 2009/4666* (2013.01)

(58) Field of Classification Search
None
See application file for complete search history.

(56) References Cited

U.S. PATENT DOCUMENTS

| 6,081,206 | A | 6/2000 | Kielland |
| 6,107,942 | A | 8/2000 | Yoo et al. |
| 6,285,297 | B1 | 9/2001 | Ball |
| 6,426,708 | B1 | 7/2002 | Trajkovic et al. |
| 6,816,085 | B1 | 11/2004 | Haynes et al. |
| 7,116,246 | B2 | 10/2006 | Winter et al. |
| 7,123,166 | B1 | 10/2006 | Haynes et al. |
| 7,652,593 | B1 | 1/2010 | Haynes et al. |

(Continued)

FOREIGN PATENT DOCUMENTS

| JP | 10091798 | 4/1998 |
| JP | 2001126192 | 5/2001 |
| JP | 2011013924 | 1/2011 |

OTHER PUBLICATIONS

Fabian, Tomas. "An algorithm for parking lot occupation detection." Computer Information Systems and Industrial Management Applications, 2008. CISIM'08. 7th. IEEE, 2008.*

(Continued)

*Primary Examiner* — Bhavesh Mehta
*Assistant Examiner* — Sean Conner
(74) *Attorney, Agent, or Firm* — Fay Sharpe LLP

(57) ABSTRACT

Described herein is a method of determining parking lot occupancy from digital images, including a set-up procedure that includes receiving a layout of a parking lot and estimating parking space volume for at least one viewing angle and the probability that an observed pixel belongs to the parking space volume. The method further includes acquiring one or more image frames of the parking lot from at least one digital camera; performing pixel classification using a vehicle detector on the acquired image frames to determine a likelihood that a pixel belongs to a vehicle; computing a probability that a parking space is occupied by a vehicle based on a spatially varying membership probability density function and a likelihood of vehicle pixels within a region of interest; and determining parking lot vacancy via a comparison of the computed probability that a parking space is occupied by a vehicle to a pre-determined threshold.

22 Claims, 8 Drawing Sheets

(56) References Cited

U.S. PATENT DOCUMENTS

| | | | |
|---|---|---|---|
| 7,688,225 B1 | 3/2010 | Haynes et al. | |
| 7,855,661 B2 | 12/2010 | Ponert | |
| 7,893,848 B2 | 2/2011 | Chew | |
| 8,059,864 B2* | 11/2011 | Huang et al. | 382/103 |
| 8,108,055 B2* | 1/2012 | Wong | 700/1 |
| 8,605,998 B2* | 12/2013 | Samples et al. | 382/159 |
| 2003/0074129 A1* | 4/2003 | Curbow et al. | 701/200 |
| 2003/0144890 A1* | 7/2003 | Dan | 705/5 |
| 2004/0015290 A1 | 1/2004 | Curbow et al. | |
| 2006/0220911 A1 | 10/2006 | Jaupitre et al. | |
| 2009/0085772 A1* | 4/2009 | Huang et al. | 340/932.2 |
| 2009/0171478 A1* | 7/2009 | Wong | 700/13 |
| 2009/0179776 A1 | 7/2009 | Holden | |
| 2012/0117084 A1* | 5/2012 | Tang et al. | 707/748 |
| 2012/0184845 A1* | 7/2012 | Ishikawa et al. | 600/425 |
| 2012/0269384 A1* | 10/2012 | Jones et al. | 382/103 |
| 2013/0057686 A1* | 3/2013 | Genc et al. | 348/148 |

OTHER PUBLICATIONS

Huang, Ching-Chun, and Sheng-Jyh Wang. "A hierarchical bayesian generation framework for vacant parking space detection." Circuits and Systems for Video Technology, IEEE Transactions on 20.12 (2010): 1770-1785.*

Wu, Qi, et al. "Robust parking space detection considering inter-space correlation." Multimedia and Expo, 2007 IEEE International Conference on. IEEE, 2007.*

True, "Vacant Parking Space Detection in Static Images", University of California, San Diego, 2007.

Huang, et al., "A Hierarchical Bayesian Generation Framework for Vacant Parking Space Detection", IEEE Transactions on Circuits and Systems for Video Technology, vol. 20, No. 12, pp. 1770-1785, Dec. 2010.

Shotton, "TextonBoost for Image Understanding", University of Cambridge, 2007.

Burges, "A Tutorial on Support Vector Machines for Pattern Recognition", Data Mining and Knowledge Discovery, 2, pp. 121-167 (1998), Kluwer Academic Publishers, Boston, 1998.

Ahonen, et al., "Face Recognition with Local Binary Patterns", ECCV 2004, LNCS 3021, pp. 469-481, Springer-Verlag Berlin Heidelberg 2004.

United Kingdom Intellectual Property Office Search Report dated Sep. 11, 2013.

* cited by examiner

METHOD OF DETERMINING PARKING LOT OCCUPANCY FROM DIGITAL CAMERA IMAGES

BACKGROUND

While the exemplary embodiment is particularly directed to the art of digital image processing and will be thus described with specific reference thereto, it will be appreciated that the exemplary embodiment may have usefulness in other fields and applications.

By way of background, detection of parking space availability is of great importance worldwide due to its high correlation with fuel consumption and traffic congestion. Studies show that in densely populated U.S. cities, such as San Francisco and New York City, a considerable percentage of traffic is related to cruising for empty parking spaces. For example, it is estimated that approximately one-third of traffic and one-half of fuel used in San Francisco is due to vehicles searching for vacant parking spaces. A study on parking spaces related issues performed in Brooklyn revealed that 45% of total traffic and 64% of local traffic is looking for an open parking space. Therefore, the automatic estimation of parking lot occupancy, as well as vacant space detection, can address the problems of fuel consumption and traffic in busy areas. Parking is typically enforced with very little automation, which makes the process inefficient and often ineffective. Inexpensive automatic and semi-automatic parking enforcement systems are needed. While systems based on parking sensors are available, they typically involve large installation and deployment costs, as well as procurement of installation permits, a process that is not without difficulties. A system composed of a set of cameras would not only provide an inexpensive solution that is easy to deploy but also support other tasks such as traffic law enforcement and surveillance which would provide added value to the customer. One of the main challenges for camera-based enforcement systems is the determination of the occupancy rate and vacancy location from images and video.

An automated system that performs parking lot occupancy estimation and detects locations of vacant spaces is needed. This information can, in turn, be relayed to drivers via radio, Internet, on-road signs, and/or GPS auxiliary signals.

BRIEF DESCRIPTION

In one embodiment, a method of determining parking lot occupancy from digital images is provided. The method includes a set-up procedure comprising the steps of obtaining a layout of a parking lot having a plurality of parking spaces and estimating a parking space volume for at least one viewing angle and the probability that an observed pixel belongs to the parking space volume. The method further includes the steps of acquiring one or more image frames of the parking lot from at least one digital camera; performing pixel classification using at least one vehicle detector on the acquired one or more image frames to determine a likelihood that a pixel belongs to a vehicle; computing a probability that a parking space is occupied by a vehicle based on a spatially varying membership probability density function (PDF) and a likelihood of vehicle pixels within a region of interest; and determining parking lot vacancy via a comparison of the computed probability that a parking space is occupied by a vehicle to a pre-determined threshold.

In another embodiment, a system for determining parking lot occupancy from digital images is provided. The system includes a database that stores digital images and data related to digital image processing and an image processing unit that includes a processor, a system memory, and a system bus that couples the system memory to the processing unit. The image processing unit is operative to: obtain a layout of a parking lot having a plurality of parking spaces; estimate a parking space volume for at least one viewing angle and the probability that an observed pixel belongs to the parking space volume; acquire one or more image frames of the parking lot from at least one digital camera; perform pixel classification using at least one vehicle detector on the acquired one or more image frames to determine a likelihood that a pixel belongs to a vehicle; compute a probability that a parking space is occupied by a vehicle based on a spatially varying membership probability density function (PDF) and a likelihood of vehicle pixels within a region of interest; and determine parking lot vacancy via a comparison of the computed probability that a parking space is occupied by a vehicle to a pre-determined threshold.

In yet another embodiment, a non-transitory computer-usable data carrier storing instructions that, when executed by a computer, cause the computer to perform a method of determining parking lot occupancy from digital images is provided. The method includes a set-up procedure comprising the steps of obtaining a layout of a parking lot having a plurality of parking spaces and estimating a parking space volume for at least one viewing angle and the probability that an observed pixel belongs to the parking space volume. The method further includes the steps of acquiring one or more image frames of the parking lot from at least one digital camera; performing pixel classification using at least one vehicle detector on the acquired one or more image frames to determine a likelihood that a pixel belongs to a vehicle; computing a probability that a parking space is occupied by a vehicle based on a spatially varying membership probability density function (PDF) and a likelihood of vehicle pixels within a region of interest; and determining parking lot vacancy via a comparison of the computed probability that a parking space is occupied by a vehicle to a pre-determined threshold.

DETAILED DESCRIPTION

Figure 1:
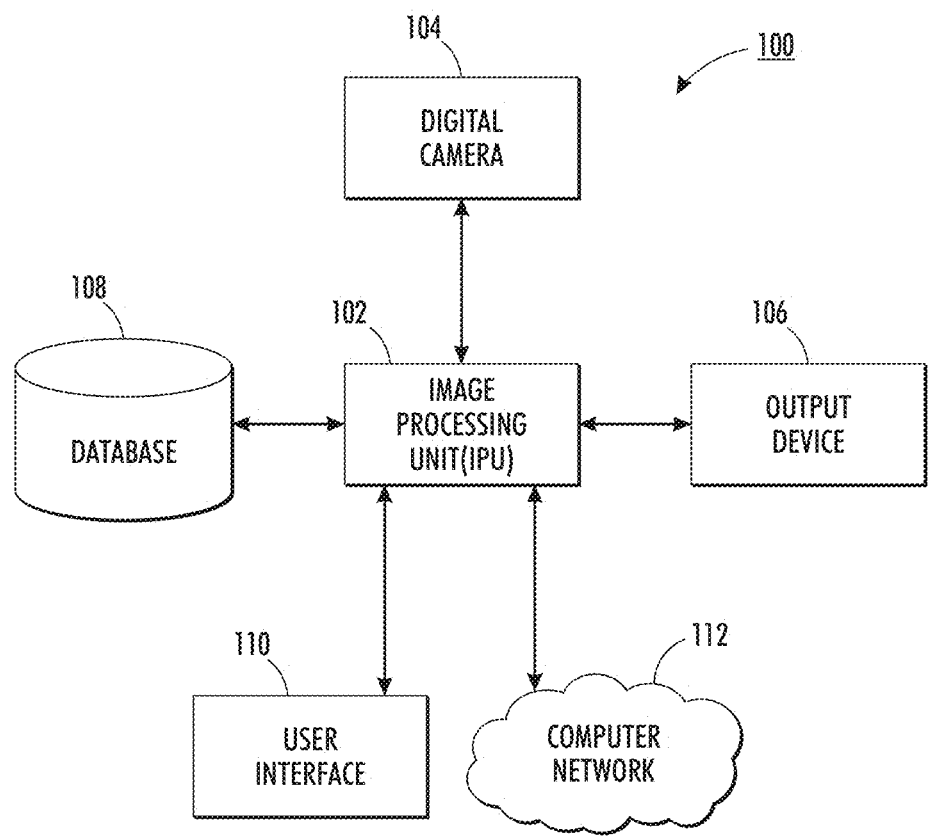
FIG. 1 is a block diagram illustrating a digital image processing apparatus suitable for implementing the exemplary method of determining parking lot occupancy from one or more camera images.

In the following description, reference is made to the drawings. In the drawings, like reference numerals have been used throughout to designate identical elements. Although embodiments will be described with reference to the embodiment shown in the drawings, it should be understood that embodiments may be employed in many alternate forms. In addition, any suitable size, shape or type of elements or materials could be used without departing from the spirit of the exemplary embodiments.

Described herein is a method and system for marked parking lot occupancy detection from one or more camera views. A common way to mount the camera at an acceptable elevation is on a lamp post; however, it is to be understood that any elevated mounting of the camera (e.g., higher than 8 feet) would be suitable. The exemplary embodiment focuses on marked parking lot occupancy detection from lamp-post camera views, but it is also relevant to on-street parking, particularly for streets with painted lines (i.e., demarked "stalls"). At a higher level, an aspect of the exemplary embodiment is a set of image processing steps that determine the occupancy rate and occupancy/vacancy locations from still images. In particular, the exemplary embodiment generally includes (1) a semi-manual algorithm to determine the layout of a parking lot using user marker lines, (2) a segmentation algorithm to perform vehicle/background discrimination, and (3) an occupancy determination algorithm using vehicle volume modeling.

FIG. 1 diagrammatically illustrates a digital image processing apparatus 100 for implementing the exemplary method. The digital image processing apparatus 100 formed in accordance with the exemplary embodiment comprises an image processing unit (IPU) 102 for performing digital age processing and other electronic computational operations.

A computer is one possible hardware configuration for the IPU 102. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

Although not specifically shown in the figure, as known to one skilled in the art the IPU 102 typically includes a processing unit, a system memory, and a system bus that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The IPU 102 can further include a hard disk drive, a magnetic disk drive, e.g., to read from or write to a removable disk, and an optical disk drive, e.g., for reading a CD-ROM disk or to read from or write to other optical media. The IPU 102 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

A number of program modules may be stored in the drives and RAM, including an operating system, one or more application programs, other program modules, and program noninterrupt data. The operating system in the IPU 102 can be any of a number of commercially available operating systems.

The IPU 102 is operably coupled to a digital image input device 104, such as a digital camera, that receives an image as input and derives digital image data representative of the image as is well understood in the art. The IPU 102 receives the digital image data from the image input device 104.

The IPU 102 is also operably coupled to one or more output devices 106 that receive digital image data from the IPU 102. The image output device(s) 106 may comprise a digital data storage device that stores the digital image data for later retrieval (e.g., CD-ROM, magnetic media, or other storage medium), and/or a video display terminal that generates a visual image based upon the digital image data.

As illustrated herein, the IPU 102 is optionally connected to a computer network 112. As such, the IPU 102 can send digital image data to and receive digital image data from any network(s) to which it is connected. The IPU 102 can operate in a networked environment using logical and/or physical connections to one or more remote computers. The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet. When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The IPU 102 is also operably coupled to a digital image database 108 that stores data related to digital image processing. This digital image database 108 can be a simple fixed magnetic disk drive and/or removable magnetic disk, an optical media reader (e.g., a CD-ROM input device) that receives an optical storage medium, and/or any other suitable digital image data storage device that includes and/or is adapted to receive and read a digital image storage medium.

The apparatus 100 of FIG. 1 may optionally comprise a user interface (UI) 110 operably coupled to the IPU 102. The UI 110, which comprises any suitable input/output device, is used by a user to receive information from and input information to the image processing unit 102. Suitable user interface devices include keyboards/keypads, mechanical buttons/switches, video display terminals with graphical user interfaces, pointing devices such as a joystick or mouse, voice command input devices, touch screens and/or any other suitable input/output device by which a user can receive information from and input information to the IPU 102.

Those of ordinary skill in the art will recognize that it is possible for some overlap to exist in connection with the UI 110 and output device(s) 106. For example, a video display terminal or screen of the output device 106 can also be part of the UI 110 and provide visual information to the user.

Those of ordinary skill in the art will also recognize that an apparatus formed in accordance with FIG. 1, including the IPU 102, can be provided by a wide variety of known systems.

Figure 2:
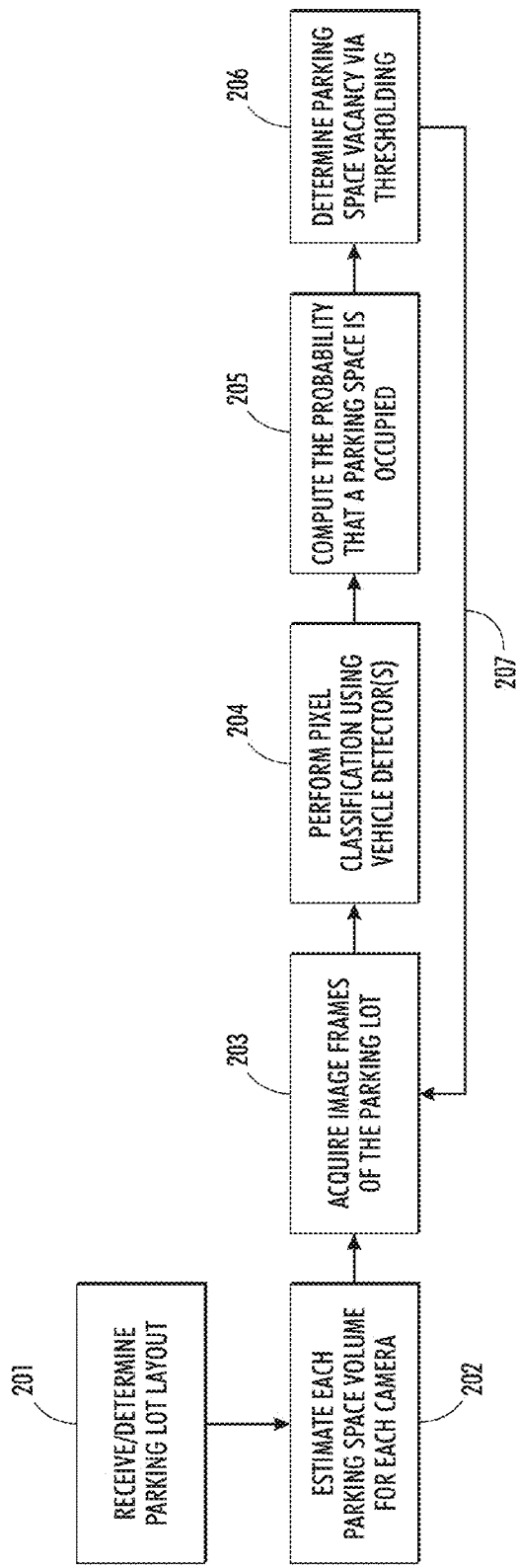
FIG. 2 is a flow chart of the exemplary method of determining parking lot occupancy from the camera images.

With reference now to FIG. 2, at a more specific level, the steps of the exemplary method may include: (1) receiving and/or determining (or otherwise obtaining) the layout of the parking lot in question (201); (2) estimating parking space volume for one or more viewing angles along with the probability that an observed pixel belongs to the given parking volume (i.e., the membership probability density function, or PDF) (202); (3) acquiring one or more image frames of the parking lot from at least one digital camera preferably mounted on an elevated structure such as a lamp post (203); (4) performing pixel classification using at least one vehicle detector (or vehicle detection algorithm) on the acquired image frames to determine the likelihood that a given pixel corresponds to a vehicle (204); (5) computing the probability that a parking space is occupied by a vehicle based on the spatially varying membership PDF and the likelihood of vehicle pixels within the region of interest (205); and (6) determining parking lot vacancy via a comparison of the computed probability to a pre-determined threshold (Th) (206). It is noted that a feedback loop 207 may be introduced, as shown in FIG. 2, to emphasize that at least some of the steps (203-206) are typically repeated as time progresses and as needed, while other steps (201 and 202) are generally performed once for a given parking lot and camera installation. Each of these steps will be explained in greater detail below.

The first step (201) is to receive and/or determine the parking space layout for a parking lot of interest. In order to determine the vacancies in a parking lot (i.e., how many spaces are available and, more importantly, where they are) it is beneficial to have some knowledge about the layout of the parking lot of interest. There are various ways to gather this information. For example, it is possible to use already existing parking lot blue-print(s) plus the knowledge of the camera installation setting to infer the parking lot layout. It is also possible to learn the parking lot layout over time by putting together partial information of the parking lot occupancy received daily. Another approach is to detect the marks (or lines) defining a parking space directly from the acquired images (ideally from an acquired image when the parking lot is mostly empty). With regard to the exemplary embodiment, a semi-manual approach with a UI 300 may be used to perform this task (see FIG. 3). For example, via the UI 300, the user may be asked to draw lines (or otherwise input) where their intersections will define the corners of parking spaces. Note that since it is only necessary to define the parking space layout once per camera installation, this approach is suitably accurate and effective for this implementation. Note that for some parking lots, curved lines can also be used to define parking spaces when appropriate.

Figure 3:
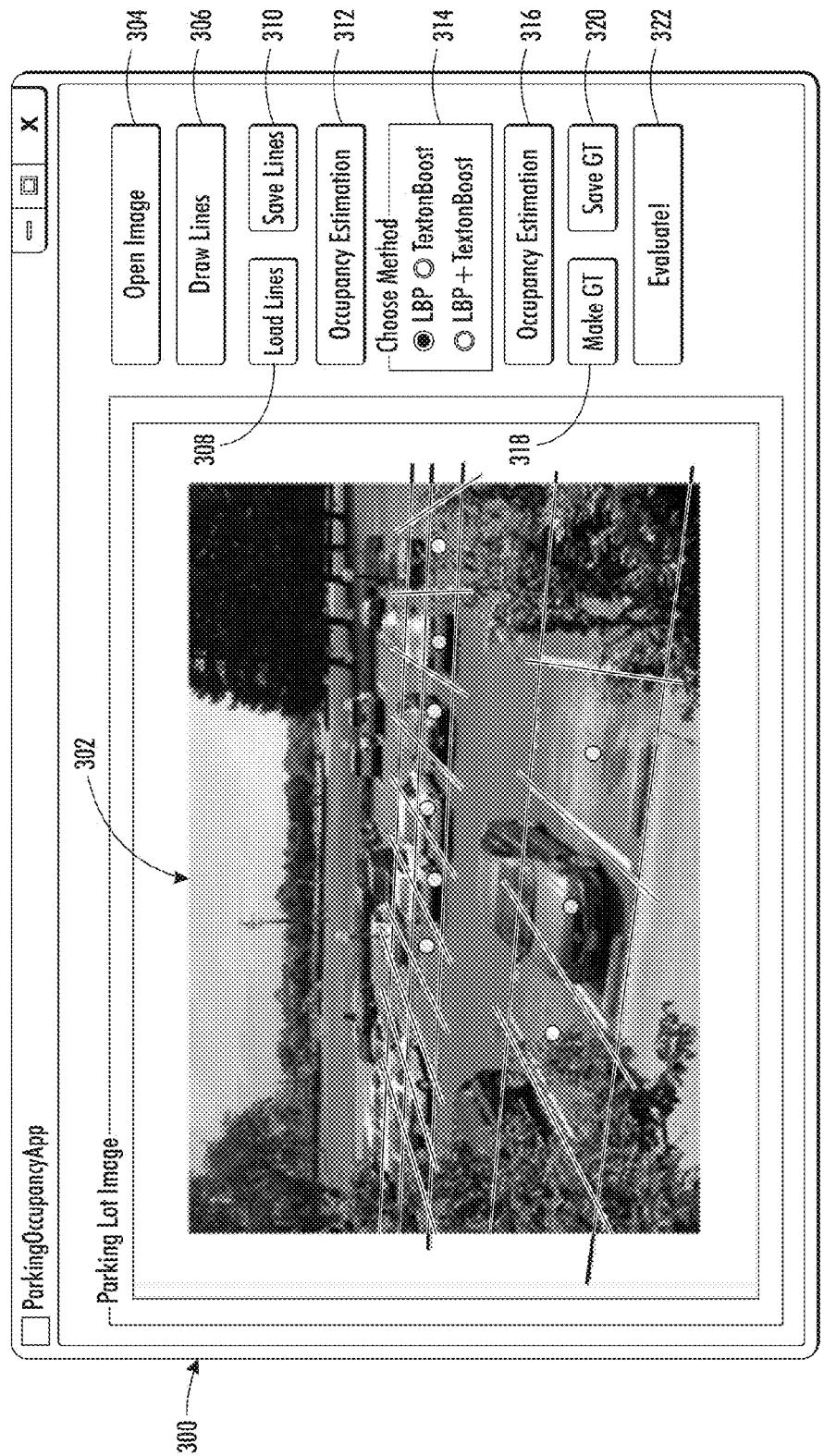
FIG. 3 is an exemplary user interface (UI) for specifying a parking lot layout.

As shown in FIG. 3, the exemplary UI 300 generally includes at least a Parking Lot Image screen 302. In addition, the UI 300 may include other various functions, such as "Open Image" (304), "Draw Lines" (306), "Load Lines" (308), "Save Lines" (310), "Pixel Classification" (312), "Choose Method" (314) (e.g., LBP, TextonBoost, LBP+TextonBoost), "Occupancy Estimation" (316), "Make Ground Truth" (318), "Save Ground Truth" (320), and/or "Evaluate" (322). It is to be understood, however, that other UI layouts are possible and that other functions may be included.

Figure 4:
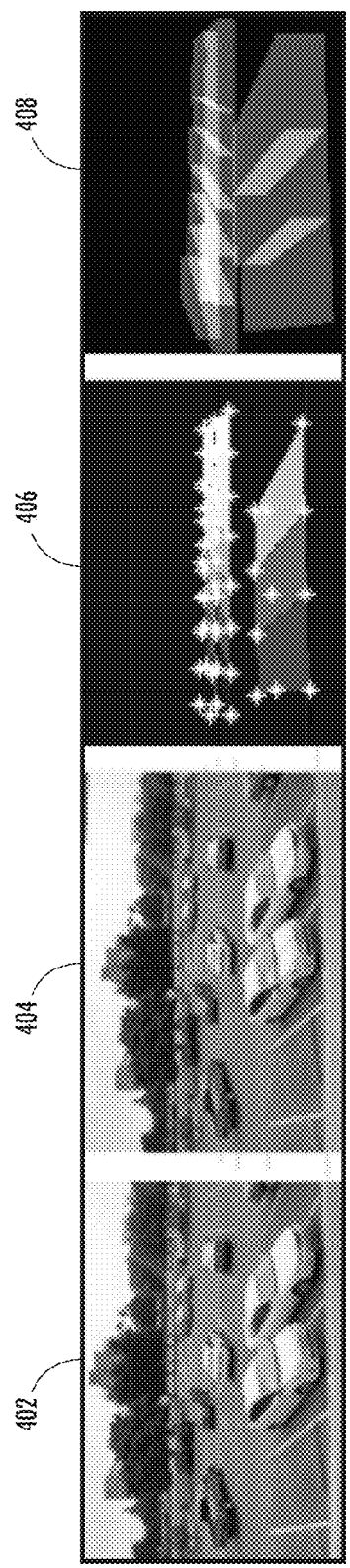
FIG. 4 illustrates an estimation of parking space volume using the exemplary vehicle volume modeling method.

Returning now to FIG. 2, the second step (202) of the method is to estimate parking volumes to account for the perspective view of the camera(s). That is, a parked car may appear to occupy more than a single parking space (or extend past the defined parking lines) because of the camera perspective. In this regard, FIG. 4 illustrates an estimation of parking lot volume for a given image/view 402 of the parking lot using the proposed vehicle volume modeling method.

In this step, the volume associated with a parking space in the image 402 is estimated, i.e., the three-dimensional (3-D) region associated with an imaged parking space in which a parked vehicle may be observed. The volume may be estimated, for example, by approximating the parking space with a parallelepiped. This may be accomplished by using the marker lines of the parking space from the first step 201 (404), as well as estimating the height, for example, as half of the average lengths of the four base sides (406 and 408). The mask of the parallelepiped viewed from a given camera angle may be obtained by simple geometric operations, which yield the projection of the 3-D region (volume to be exact) of interest for the given parking space (408). Next, for each pixel within this region, a probability of its membership to the given parking space is assigned. This is preferable, since there is inherent uncertainty regarding the location of two-dimensional (2-D) image pixels representing a 3-D scene. This membership PDF is a function of the distance from the center of the region of interest (center pixels have larger weight) and the number of possible overlapping regions (occlusion, color coded regions in 408) with neighboring parking spaces. The details of this membership PDF are described with regard to the fifth step (205).

In the third step (203) of the method, at least one image frame of the parking lot, I(x), is acquired from at least one digital camera mounted, for example, on a lamp post or similar elevated structure. The image will be further processed in subsequent steps to determine the occupancy of the parking lot and/or parking spaces of interest within the lot.

Figure 5:
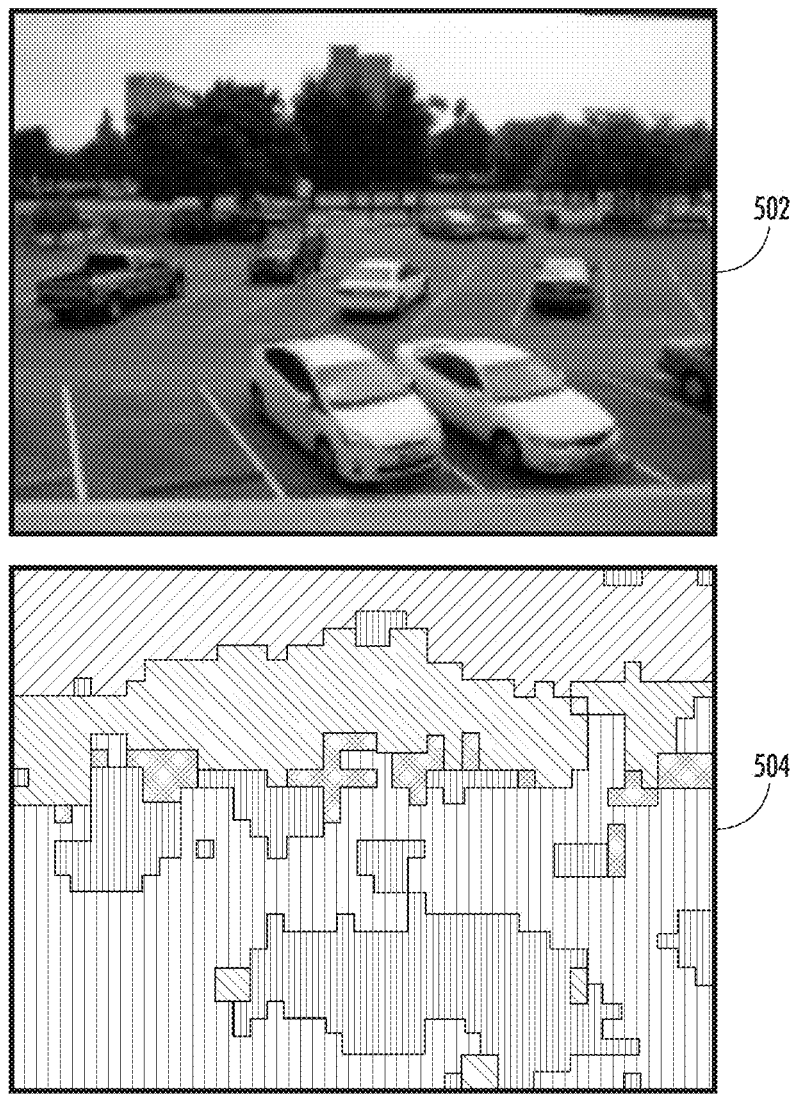
FIG. 5 shows pixel classification results using the LBP-SVM vehicle classifier.

The fourth step (204) of the method is to perform pixel classification using at least one type of vehicle detector (or vehicle detection algorithm). More particularly, pixel classification using at least one vehicle detector on the acquired image(s) is performed to determine the likelihood that a pixel belongs to a vehicle. In the preferred embodiment, the classifications/outputs of two different object recognition algorithms (i.e., vehicle detectors or classifiers) may be fused. By way of example, a Support Vector Machine (SVM) classifier that uses rotation-invariant local binary patterns (LBP) as input features and/or a TextonBoost (TB) classifier may be used. It is to be understood, however, that other vehicle detectors may be used with the exemplary method. The output of this step is a probability map, $P_v(x)$, which indicates the likelihood that a pixel x belongs to a vehicle (thus providing evidence that the space is occupied). FIG. 5 shows a sample result 504 when applying a LBP-SVM vehicle classifier to an image 502.

Figure 6:
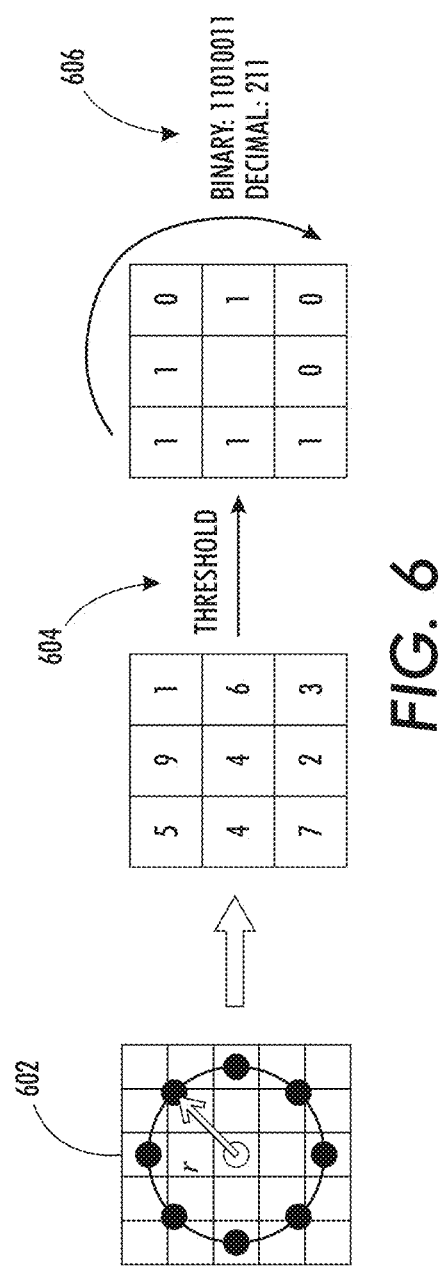
FIG. 6 illustrates a local binary pattern encoding scheme.

With reference to FIG. 6, the SVM classifier using rotation-invariant LBP as input features will be described in greater detail below. Local binary patterns are generally good texture descriptors of an image and have been successfully used in the context of face recognition. Thus, for every pixel in the image, the surrounding neighbors approximately at a selected radius r away from the center are considered, as in the first diagram 602 of FIG. 6. Every neighbor having a value greater than or equal to the given pixel (e.g., the center pixel) is assigned code 1, and every neighbor having a lower value is assigned code 0. The resulting binary code sequence is then traversed as shown in the second diagram 604. Therefore, when considering 8 neighbors, the 8 binary values are strung together to form a byte (606). This binary value is converted to decimal (e.g., 11010011), and thus a single number (211) is obtained. This number is the LBP code value for the given pixel. This process is repeated for every pixel in the image, and thus a code image is obtained.

A uniform local binary pattern is a pattern which has at most 2 transitions between 0 and 1 in the sequence of bits. For example, the following patterns are uniform: 00001100, 11110011, 111111111, 00000000, 00011111. And the following patterns are not uniform: 00110011, 01010101.

Rotation invariant patterns consider all sequences that only differ by a cyclic offset to be equivalent. For example, the following patterns list all the possible rotation invariant versions of 00110000: 00011000, 00001100, 00000110, 00000011, 10000001, 11000000, and 01100000. In the present case, the sequence with the smallest decimal value to every member of the set of sequences that are rotation invariant may be assigned.

The image may be split into a grid of m×m pixels (e.g., m=15), and the histogram of the rotation invariant uniform LBP values within each block may be computed.

Every block may be labeled based on ground truth (i.e., human labeled data, assumed to be absolutely correct, which is used for training and evaluation purposes) as belonging to one of various types of objects, such as vehicle, pavement, tree, sky, building and/or void (none of the above). It is to be understood, however, types of objects may be used, depending on the location of the parking lot and other circumstances. The histograms of the values inside each block may be used as feature vectors to train an SVM classifier. By way of example, five of the most common objects in a parking lot setting may be used, even though the primary interest is generally the vehicle class.

Thus, the output of the classifier is generally treated as a binary output (this type of classifier is denoted as a "hard classifier"), representing whether the pixel x belongs to a vehicle or not:

$$P_v(x) = P_v^{LBP}(x) \in \{0,1\} \quad (1)$$

Next, the TextonBoost classifier will be described in greater detail. TextonBoost is an object recognition method, introduced by Jamie Shaton in "TextonBoost for Image Understanding: Multi-Class Object Recognition and Segmentation by Jointly Modeling Texture, Layout, and Context" (2007). It uses a conditional random field model for learning the conditional distribution of object class labels across a given image. The model exploits texture-layout, color, location and edge features. TextonBoost is based on the previously mentioned classes (i.e., vehicle, tree, pavement, sky, building, and/or void). Similar to LBP, the hard output of TextonBoost may be used as a binary classifier that indicates whether a pixel x belongs to a vehicle or not:

$$P_v(x) = P_v^{TB} \in \{0,1\} \quad (2)$$

Note that when only one hard pixel classifier is used, only a hard classification output is computed. However, it may be advantageous to fuse the outputs of multiple pixel classifiers to yield a final classification decision for better vehicle pixel detection. In this case, a soft classification output obtained from the weighted fusing of the outputs of one or more classifiers may be used. For example, a vehicle detection model can incorporate both LBP and TextonBoost classifiers. In particular, for a TextonBoost classifier, the probability of a pixel belonging to the "vehicle" class for $P_v^{TB} \in [0,1]$ is used instead of the hard classification. Further, the entropy of the probability of each class label is computed, which is a measure of the uncertainty of the decision at every pixel. By scaling this value to achieve a maximum of 1, and subtracting the result from 1, it is possible to obtain a measure of the certainty of the decision at every pixel. The certainty of the decision at pixel x, $\eta_x$, ranges between 0 (low certainty) and 1 (maximum certainty). Note that one can also fuse the soft probability output of an LBP-SVM classifier, $P_v(x) = P_v^{LBP}(x) \in [0,1]$ with the hard classification output of a TextonBoost classifier, $P_v(x) = P_v^{TB}(x) \in \{0,1\}$, in a similar manner.

Set forth below is a model for the probability of pixel x being a vehicle, which uses the soft output of TextonBoost fused with the hard output of LBP:

$$P_v(x) = \eta_x P_v^{TB}(x) + (1-\eta_x) P_v^{LBP} \quad (3)$$

where $P_v^{TB}(x) \in [0,1]$ is the soft probability of a pixel corresponding to a vehicle output by TextonBoost, and $P_v^{LBP}(x) \in \{0,1\}$ is the hard classification output of a pixel corresponding to a vehicle provided by an SVM classifier with LBP values as inputs.

Alternatively, a model for a probability of pixel x being a vehicle, which uses the hard output of TextonBoost and the hard output of LBP, may comprise one of:

$$P_v(x) = \max(P_v^{TB}(x), P_v^{LBP}) \text{ or } P_v(x) = \min(P_v^{TB}(x), P_v^{LBP})$$

where $P_v^{TB}(x) \in \{0,1\}$ is the hard classification of a pixel corresponding to a vehicle, given by TextonBoost, and $P_v^{LBP}(x) \in \{0,1\}$ is the hard classification of a pixel corresponding to a vehicle, given by an SVM classifier with LBPs as inputs.

While TextonBoost and LBP features have been described in detail, other image processing features could be used in the classification process. By way of example, Histogram of Oriented Gradient (HOG), Rotation Invariant Feature Transform (RIFT), Generalized RIFT (G-RIFT), Speeded Up Robust Feature (SURF), Gradient Location and Orientation Histogram (GLOH), SIFT (Scale Invariant Feature Transform), and/or Harris Corners features may be used.

In the fifth step (205) of the method, the probability that a parking space is occupied by a vehicle may be computed based on the weighted sum of the probability of vehicle pixels within the region of interest of each parking space (see the second step (202)). As used herein, the term "region of interest" refers to the pixels that can potentially belong to a vehicle parked in a given parking space.

Here, the spatially varying weights correspond to the membership PDF introduced in the second step (202). More specifically, a Gaussian kernel centered at the centroid of the region of interest of the parking space, and oriented along the dominant direction of the region of interest is used. This gives larger weight to pixels located towards the center of the region of interest. These weights are further scaled based on the number of possible overlapping regions (possible occlusions) from the regions of interest of neighboring parking spaces.

It may be assumed that most vehicles are parked near the center of each parking space. Since not all vehicles are of the same size, it makes sense to weight more in the center of the vehicle volume. Accordingly, a weighting function, such as the one shown below, may be used:

$$w_g(x) = \frac{1}{2\pi |\Sigma|^{1/2}} e^{-\frac{1}{2}(x-x_0)^T \Sigma^{-1}(x-x_0)} \quad (4)$$

where $x_0$ is the center of the parking space volume (region of interest) and $\Sigma$ (a 2×2 matrix) contains parameters indicating the rotation of the Gaussian kernel and the rate of weight drop-off as the distance of the pixel to the center increases.

Due to the limited options provided by the available camera mounting positions, some occlusions may occur. Occlusions manifest themselves, for example, as overlapping 3-D models of parking space volumes (regions of interest). Thus, each region of interest can be split into a number of sub-regions, where each sub-region is characterized by the number of possible overlaps (occlusions) with neighboring parking spaces: not occluded, possibly occluded by one, possibly occluded by two, etc.

For a pixel in the sub-regions where occlusion may occur, either one or multiple, typically contiguous spaces can contribute to the probability that it belongs to a vehicle (which may lead to multiple counts if not dealt with properly). To improve on this limitation, sub-region weights in the form of $$w_o = \frac{1}{k^n}$$

are specified, where k indicates the discount one would like to impose to the potential occlusion sub-regions and n is the number of parking spaces claiming that sub-region (overlap).

Figure 7:
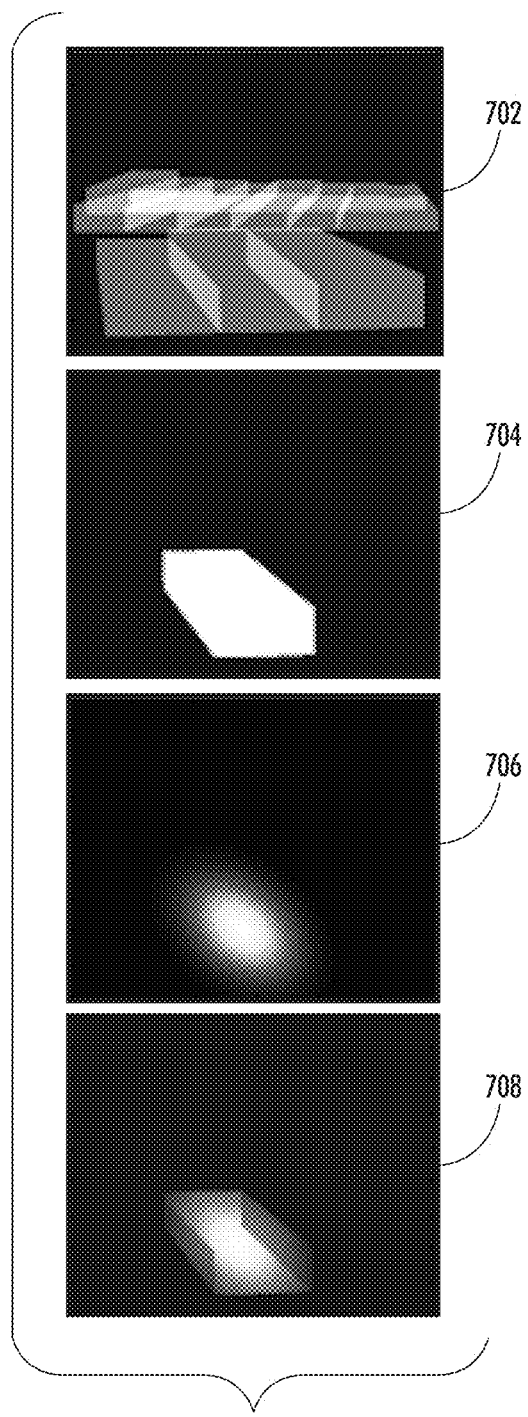
FIG. 7 shows membership probability density function of a parking space.

Combining the two weights mentioned above (the Gaussian kernel weight and the occlusion penalty weight) the final spatially varying weight for each pixel x is specified as $w(x) = w_g(x)w_o$. These values are normalized to sum to 1 within each region of interest (that is, each parking space), and thus represent the membership PDF (see FIG. 7). FIG. 7 shows the vehicle volumes of a sample parking lot (702), a sample vehicle volume (704), the sample vehicle volume's corresponding membership PDF with Gaussian kernel (706), and the sample vehicle volume's corresponding final membership PDF with both Gaussian kernel and occlusion penalty (708). Intuitively speaking, the weight is higher for pixels that are near the center of the vehicle volume and within the sub-regions where no occlusion would occur for each 3-D vehicle volume parking space.

The probability that a parking space s is occupied is given by the sum of the probabilities that each individual pixel belonging to s is occupied. Thus, this probability may be given by the joint probability that pixel x is classified a vehicle and that pixel x is a member of parking space s. It may be assumed that these two are independent, and thus the joint probability is equal to the product of the probability that pixel x is a vehicle (given by the fourth step (204)), and the probability that pixel x belongs to parking space s (given by the membership PDF). This can be expressed mathematically as:

$$P(s=\text{occupied})=\Sigma_x P(x \text{ is vehicle}, x \text{ in } s)=\Sigma_x P(x \text{ in } s)P(x \text{ is vehicle})=\Sigma_x w(x)P_v(x) \quad (5)$$

One such value, representing the probability of occupancy, for every parking space s is obtained. This value is then compared against a threshold, and a binary decision is made.

In the sixth step of the method (206), parking lot vacancy is determined via a comparison of the computed probability of each parking space to a pre-determined threshold (Th). A simple choice, for example, is Th=0.5. It is to be understood, however, that other values are possible. More sophisticated methods can be used based on the characteristics of the classifiers and/or through training. Optionally, the pre-determined threshold may be adjusted based on additional information including at least one of the total number of vehicles entering and exiting the said parking lot and the total number of vacant parking stalls.

The resulting information can, in turn, be relayed to drivers or other concerned parties via radio, the Internet, on-road signs, and/or GPS auxiliary signals.

To demonstrate the feasibility and performance of the exemplary embodiment, various parking lot images were collected to form a dataset. The dataset consisted of three sets of images. The first set of 62 images consists of approximately five different parking lots, with various views taken at approximately two different times of the day. Most of these images were taken during sunny weather but some are affected by fog. The second dataset consists of images of one parking lot, acquired at various times of the day, under different illumination. These images are all taken from very similar angle. The third set of images consists of 10 images collected from Google images searches. This is the most diverse dataset, since each image differs from the rest in terms of illumination conditions, viewing angle, etc.

Pixel-level ground truth for object classification was created manually for 32 images from the first set. These are used in the training of the vehicle detectors. The remaining images (i.e., 30 from the first set, 15 from the second set and 10 from the third set) were used for testing the system. The parking space marker lines were created from user input for these images, as well as the occupancy ground truth for each parking space. Presented below is the following performance analysis on this dataset.

Table 1 below represents a summary of the performance of LBPs of radius 1 and 2, trained on different number of images (9, 25 and 32) as well as the performance of TextonBoost trained on 32 images from the first dataset, all with occlusion parameter k=2. The values represent the percentage rate of correct detection of occupied and vacant parking spaces across the entire set of images. As expected, these methods typically work best on the first dataset, since the training data is of the same type as the test data. In the more realistic scenario the training data and test data are similar to each other, since the training is done once the system is set up, from similar views of the parking lot. The first dataset consists of different views of approximately 5 parking lots, and thus the performance is expected to increase when working with only one parking lot, observed from one view. The results on the other two datasets explore the possibility of generalizing this method.

It is noted that the LBP of radius 1 trained on 9 images generally performs the best. A possible reason for why more training images decrease the performance is a potential overfitting occurring at the SVM classifier stage.

TABLE 1

Classification accuracy of vehicle detectors

| | Test Dataset | | | | | | | |
|---|---|---|---|---|---|---|---|---|
| | LBP r = 1 | | | LBP r = 2 | | | TB | |
| | # train images | | | | | | | |
| | 9 | 25 | 32 | 9 | 25 | 32 | 32 | AVG |
| FIRST SET | 85 | 80 | 82 | 79 | 80 | 78 | 81 | 80.7 |
| SECOND SET | 63 | 63 | 61 | 64 | 59 | 55 | 73 | 62.6 |
| THIRD SET | 81 | 72 | 67 | 67 | 62 | 62 | 61 | 67.3 |
| AVERAGE | 76.2 | 71.6 | 70.2 | 70.1 | 67.0 | 65.2 | 71.3 | |

Next, the impact of the occlusion parameter, k, is considered. As can be seen from Table 2 below, the algorithm generally performs best for k=2. The LBP approach with r=1, trained on 9 images was used for this experiment.

TABLE 2

Exploration of the impact of the occlusion
parameter on classification accuracy

| Test Dataset | k = 1 | k = 1.5 | k = 2 | k = 3 | k = 4 |
|---|---|---|---|---|---|
| FIRST SET | 81 | 83 | 85 | 84 | 85 |
| SECOND SET | 64 | 64 | 63 | 65 | 64 |
| THIRD SET | 83 | 81 | 81 | 79 | 79 |
| average | 76.0 | 76.0 | 76.2 | 76.2 | 76.0 |

Generally, increasing the image size (and thus the resolution of the vehicle objects) increased the accuracy of LBP r=1 trained on 9 images, from 85% to 88%.

Next, consider the fusion of the best LBP method (r=1, trained on 9 images), with TextonBoost, using k=2. The results, from Table 3 below show that the fusion of LBP and TB classifiers yields a slight improvement over the results from individual classifiers. Intuitively, the fusion approach will attempt to pick the best among the multiple classifiers down to pixel level. The fusion strategy partially achieved the desired effect.

TABLE 3

Classification accuracy for various
classifiers with optimal parameters

| Test Dataset | LBP | TB | LBP + TB |
|---|---|---|---|
| FIRST SET | 88 | 81 | 87 |
| SECOND SET | 60 | 73 | 72 |
| THIRD SET | 83 | 61 | 76 |
| average | 76.8 | 71.3 | 78.1 |

Figure 8:
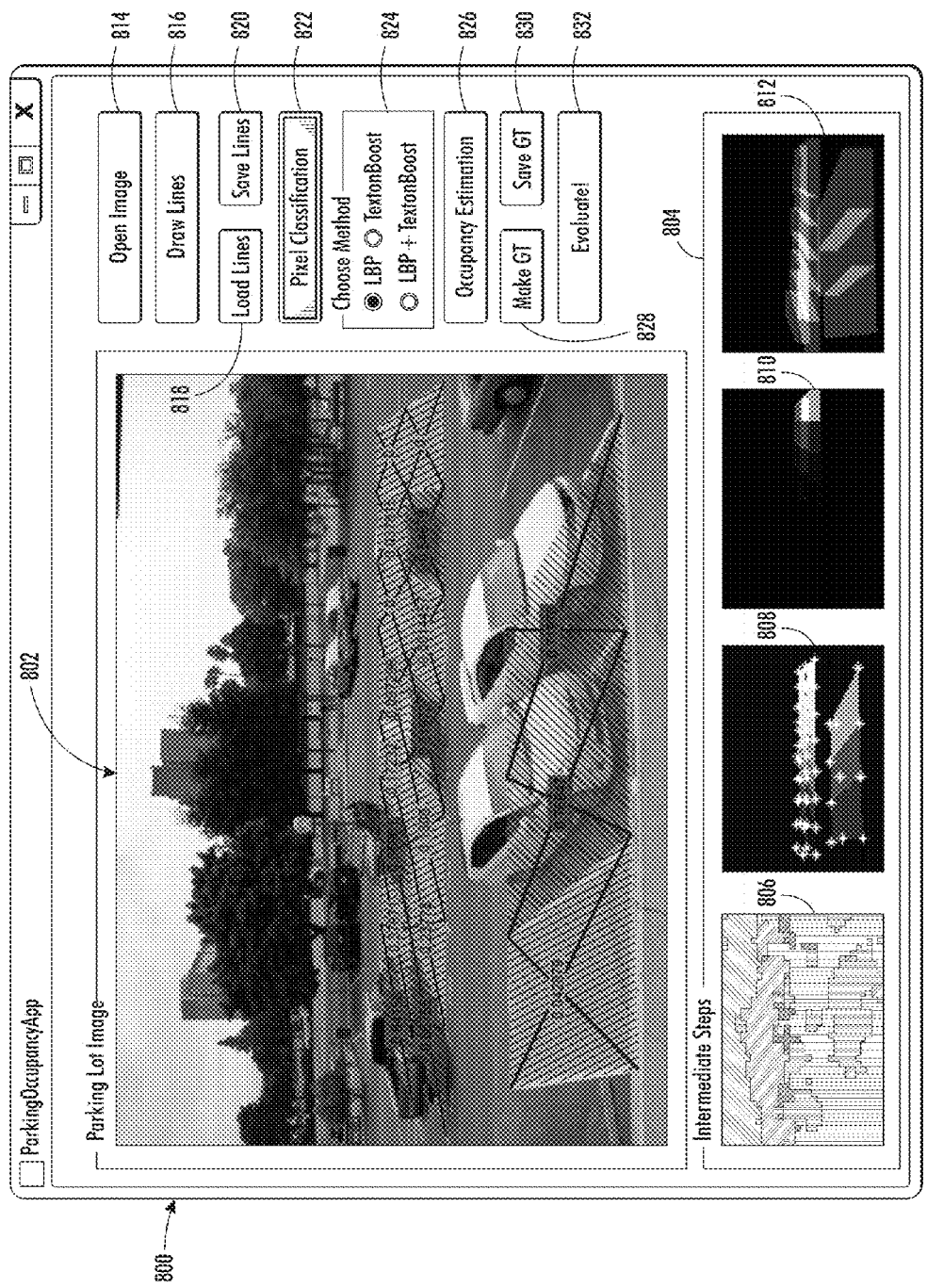
FIG. 8 shows the UI with occupancy results of a sample parking lot image analyzed by the exemplary method.

Finally, for illustrative purposes, an example of a UI 800 with a parking lot image 802 and the occupancy (or intermediate) results 804 is shown in FIG. 8. The intermediate results 804 represent: (1) the classifier output, color-coded for every class (806), (2) the parking spaces estimated from the user guide lines (808), (3) superimposed volumes of parking spaces (810), and (4) an occlusion map wherever color represents the possible number of occlusions for that particular pixel (812). And as noted earlier, the UI 800 may include other various functions, such as Open Image (814), Draw Lines (816), Load Lines (818), Save Lines (820), Pixel Classification (822), Choose Method (824) (e.g., LBP, TextonBoost, LBP+TextonBoost), Occupancy Estimation (826), Make Ground Truth (828), Save Ground Truth (830), and/or Evaluate (832).

The exemplary embodiment was described with respect to cars. However, the algorithm can be trained on other vehicles such as motorcycles and trucks, since they exhibit similar features.

Other fusion methods for combining LBP and TB (TextonBoost) results may be considered. For example {LBP λ TB} according to which a space is considered occupied if both the result of LBP and that of TB declare occupied. Another example would be {LBP v TB}, according to which a space is considered occupied if either the result of LBP or that of TB declare occupied. The output of the former method is biased towards an empty space decision unless certainty that the space is occupied is high. The output of the latter method is biased towards an occupied space decision. Decisions favoring different combination choices will be driven by specific application needs.

When the raw statistics of a given parking lot such as parking capacity, number of vehicle entering and exiting, etc. are available, the information can be used to refine the parameters in our method. As a simple example, set the probability threshold (e.g., 0.5 for LBP, and TB classifiers, 0.3 for LBP+ TB classifier) may be set between occupied and empty outputs so that the total number of occupied and total number of empty are closest to the given raw statistics of the parking lot.

The exemplary method may be implemented in a computer program product that may be executed on a computing device. The computer program product may be a non-transitory computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of determining parking lot occupancy from digital images, the method comprising:
    obtaining a layout of a parking lot having a plurality of parking spaces;
    estimating parking space volume for at least one viewing angle of at least one parking space and the probability that an observed pixel belongs to the parking space volume;
    acquiring one or more image frames of the parking lot from at least one digital camera;
    performing pixel classification using at least one vehicle detector on the acquired one or more image frames to determine a likelihood that a pixel corresponds to a vehicle;
    computing a probability that the at least one parking space is occupied by a vehicle based on a weighted sum of the probability of vehicle pixels within the region of interest of each parking space, wherein the region of interest refers to pixels that can potentially belong to a vehicle parked in a given parking space, wherein the weighted sum comprises a weighting function which gives larger weight to pixels located towards a center of the region of interest of each parking space, the weighting function decreasing the weight of a particular pixel as a distance of the particular pixel to the center increases; and
    determining parking lot vacancy via a comparison of the computed probability that the at least one parking space is occupied by a vehicle to a pre-determined threshold.

2. The method of claim 1, further comprising: performing the pixel classification using at least one of a support vector machine (SVM) classifier that uses rotation-invariant local binary patterns (LBPs) as input features and a TextonBoost classifier.

3. The method of claim 2, further comprising using a model for a probability of pixel x being a vehicle, which uses a soft output of the TextonBoost classifier and a hard output of the SVM classifier, the model comprising:

$$P_v(x) = \eta_x P_v^{TB}(x) + (1-\eta_x) P_v^{LBP}$$

where $P_v^{TB}(x) \in [0,1]$ is the soft probability of a pixel corresponding to a vehicle, given by the TextonBoost classifier, and $P_v^{LBP}(x) \in \{0,1\}$ is the hard classification of a pixel corresponding to a vehicle, given by the SVM classifier with LBP values as inputs.

4. The method of claim 2, further comprising using a model for a probability of pixel x being a vehicle, which uses a hard output of the TextonBoost classifier and a hard output of the SVM classifier, the model comprising one of:

$$P_v(x) = \max(P_v^{TB}(x), P_v^{LBP}) \text{ or } P_v(x) = \min(P_v^{TB}(x), P_v^{LBP})$$

where $P_v^{TB}(x) \in \{0,1\}$ is the hard classification of a pixel corresponding to a vehicle, given by the TextonBoost classifier, and $P_v^{LBP}(x) \in \{0,1\}$ is the hard classification of a pixel corresponding to a vehicle, given by the SVM classifier with LBPs as inputs.

5. The method of claim 1, further comprising: performing the pixel classification using one or more of a support vector machine (SVM) classifier that uses rotation-invariant local binary patterns (LBPs) as input features, a TextonBoost classifier, a Histogram of Oriented Gradient (HOG) classifier, a Rotation Invariant Feature Transform (RIFT) classifier, a Generalized RIFT (G-RIFT) classifier, a Speeded Up Robust Feature (SURF) classifier, a Gradient Location and Orientation Histogram (GLOH) classifier, a SIFT (Scale Invariant Feature Transform) classifier, and/or a Harris Corners classifier.

6. The method of claim 1, wherein the pre-determined threshold is 0.5.

7. The method of claim 1, wherein the pre-determined threshold is adjusted based on additional information including at least one of the total number of vehicles entering and exiting the said parking lot and the total number of vacant parking stalls.

8. The method of claim 1, wherein obtaining the parking lot layout further comprises: automatically detecting one or more markers or lines defining one or more parking spaces from images of the parking lot when the parking lot was at least partially empty or receiving data input by a user via a user interface, wherein the data comprises markers or lines on one or more images of the parking lot and the intersections of the markers or lines define one or more corners of parking spaces.

9. The method of claim 1, wherein estimating the volume associated with the at least one parking space in the image further comprises: approximating the at least one parking space with a parallelepiped by using marker lines of the at least one parking space and estimating the height as approximately half of the average lengths of the four base sides; obtaining a mask of the parallelepiped viewed from a given camera angle by geometric operations that yield a projection of a three-dimensional region of interest for the at least one parking space; for each pixel within the region, assigning a probability of the pixel's membership to the at least one parking space, wherein the membership probability density function is a function of the distance from a center of the region of interest and a plurality of possible overlapping regions with neighboring parking spaces.

10. A system for determining parking lot occupancy from digital images, the system comprising:
a database that stores digital images and data related to digital image processing, wherein the data includes one or more parking lot layouts; and
an image processing unit that includes a processor, a system memory, and a system bus that couples the system memory to the processing unit, wherein the image processing unit is operative to:
obtain a layout of a parking lot having a plurality of parking spaces;
estimate parking space volume for at least one viewing angle of at least one parking space and the probability that an observed pixel belongs to the parking space volume;
acquire one or more image frames of the parking lot from at least one digital camera;
perform pixel classification using at least one vehicle detector on the acquired one or more image frames to determine a likelihood that a pixel belongs to a vehicle;
compute a probability that the at least one parking space is occupied by a vehicle based on a weighted sum of the probability of vehicle pixels within the region of interest of each parking space, wherein the region of interest refers to pixels that can potentially belong to a vehicle parked in a given parking space, wherein the weighted sum comprises a weighting function which gives larger weight to pixels located towards a center of the region of interest of each parking space, the weighting function decreasing the weight of a particular pixel as a distance of the particular pixel to the center increases; and
determine parking lot vacancy via a comparison of the computed probability that the at least one parking space is occupied by a vehicle to a pre-determined threshold.

11. The system of claim 10, wherein the image processing unit is further operative to perform the pixel classification using at least one of a support vector machine classifier that uses rotation-invariant local binary patterns (LBPs) as input features and a TextonBoost classifier.

12. The system of claim 11, wherein the image processing unit is further operative to use a model for a probability of pixel x being a vehicle, which uses a soft output of the TextonBoost classifier and a hard output of the SVM classifier, the model comprising:

$$P_v(x) = \eta_x P_v^{TB}(x) + (1-\eta_x) P_v^{LBP}$$

where $P_v^{TB}(x) \in [0,1]$ is the soft probability of a pixel corresponding to a vehicle, given by the TextonBoost classifier, and $P_v^{LBP}(x) \in \{0,1\}$ is the hard classification of a pixel corresponding to a vehicle, given by the SVM classifier with LBPs as inputs.

13. The system of claim 11, wherein the image processing unit is further operative to use a model for a probability of pixel x being a vehicle, which uses a hard output of the TextonBoost classifier and a hard output of the SVM classifier, the model comprising one of:

$$P_v(x) = \max(P_v^{TB}(x), P_v^{LBP}) \text{ or } P_v(x) = \min(P_v^{TB}(x), P_v^{LBP})$$

where $P_v^{TB}(x) \in \{0,1\}$ is the hard classification of a pixel corresponding to a vehicle, given by the TextonBoost classifier, and $P_v^{LBP}(x) \in \{0,1\}$ is the hard classification of a pixel corresponding to a vehicle, given by the SVM classifier with LBPs as inputs.

14. The system of claim 10, wherein the pre-determined threshold is 0.5.

15. The system of claim 10, wherein the image processing unit is further operative to adjust the pre-determined threshold based on additional information including at least one of the total number of vehicles entering and exiting the said parking lot and the total number of vacant parking stalls.

16. The system of claim 10, wherein the image processing unit is further operative to obtain the parking lot layout by:

automatically detecting one or more markers or lines defining one or more parking spaces from images of the parking lot when the parking lot was at least partially empty or receiving data input by a user via a user interface, wherein the data comprises markers or lines on one or more images of the parking lot and the intersections of the markers or lines define one or more corners of parking spaces.

17. The system of claim 10, wherein the image processing unit is further operative to estimate the volume associated with the at least one parking space in the image by: approximating the at least one parking space with a parallelepiped by using marker lines of the parking space and estimating the height as approximately half of the average lengths of the four base sides; obtaining a mask of the parallelepiped viewed from a given camera angle by geometric operations that yield a projection of a three-dimensional region of interest for the at least one parking space; for each pixel within the region, assigning a probability of the pixel's membership to the at least one parking space, wherein the membership probability density function is a function of the distance from a center of the region of interest and a plurality of possible overlapping regions with neighboring parking spaces.

18. A method of determining parking lot occupancy from digital images, the method comprising:
obtaining a layout of a parking lot having a plurality of parking spaces;
estimating parking space volume for at least one viewing angle of at least one parking space and the probability that an observed pixel belongs to the parking space volume;
acquiring one or more image frames of the parking lot from at least one digital camera;
performing pixel classification using at least one vehicle detector on the acquired one or more image frames to determine a likelihood that a pixel corresponds to a vehicle, wherein the pixel classification is performed using at least one of a support vector machine (SVM) classifier that uses rotation-invariant local binary patterns (LBPs) as input features and a TextonBoost classifier;
computing a probability that the at least one parking space is occupied by a vehicle based on a spatially varying membership probability density function and a likelihood of vehicle pixels within a region of interest;
using one of a first model and a second model to determine a probability of pixel x being a vehicle, wherein the first model uses a soft output of the TextonBoost classifier and a hard output of the SVM classifier and the second model uses a hard output of the TextonBoost classifier and a hard output of the SVM classifier,
wherein the first model comprises:

$$P_v(x) = \eta_x P_v^{TB}(x) + (1-\eta_x) P_v^{LBP}$$

where $P_v^{TB}(x) \in [0,1]$ is the soft probability of a pixel corresponding to a vehicle, given by the TextonBoost classifier, and $P_v^{LBP}(x) \in \{0,1\}$ is the hard classification of a pixel corresponding to a vehicle, given by the SVM classifier with LBP values as inputs, and wherein the second model comprises one of:

$$P_v(x) = \max(P_v^{TB}(x), P_v^{LBP}) \text{ or } P_v(x) = \min(P_v^{TB}(x), P_v^{LBP})$$

where $P_v^{TB}(x) \in \{0,1\}$ is the hard classification of a pixel corresponding to a vehicle, given by the TextonBoost classifier, and $P_v^{LBP}(x) \in \{0,1\}$ is the hard classification of a pixel corresponding to a vehicle, given by the SVM classifier with LBPs as inputs; and determining parking lot vacancy via a comparison of the computed probability that the at least one parking space is occupied by a vehicle to a pre-determined threshold.

19. The method of claim 18, wherein the pre-determined threshold is 0.5.

20. The method of claim 18, wherein the method further comprises adjusting the pre-determined threshold based on additional information including at least one of the total number of vehicles entering and exiting the said parking lot and the total number of vacant parking stalls.

21. The method of claim 18, wherein obtaining the parking lot layout further comprises: automatically detecting one or more markers or lines defining one or more parking spaces from images of the parking lot when the parking lot was at least partially empty or receiving data input by a user via a user interface, wherein the data comprises markers or lines on one or more images of the parking lot and the intersections of the markers or lines define one or more corners of parking spaces.

22. The method of claim 18, wherein estimating the volume associated with the at least one parking space in the image further comprises: approximating the at least one parking space with a parallelepiped by using marker lines of the at least one parking space and estimating the height as approximately half of the average lengths of the four base sides; obtaining a mask of the parallelepiped viewed from a given camera angle by geometric operations that yield a projection of a three-dimensional region of interest for the at least one parking space; for each pixel within the region, assigning a probability of the pixel's membership to the at least one parking space, wherein the membership probability density function is a function of the distance from a center of the region of interest and a plurality of possible overlapping regions with neighboring parking spaces.

\* \* \* \* \*